(12) United States Patent
Roundtree et al.

(10) Patent No.: US 8,572,189 B2
(45) Date of Patent: Oct. 29, 2013

(54) METHOD AND SYSTEM FOR CONFIGURING E-MAIL FOR MOBILE DEVICES

(75) Inventors: Brian Roundtree, Kirkland, WA (US); Jake A. Russell, Bellevue, WA (US)

(73) Assignee: Nuance Communications, Inc., Burlington, MA (US)

( * ) Notice: Subject to any disclaimer, the term of this patent is extended or adjusted under 35 U.S.C. 154(b) by 767 days.

(21) Appl. No.: 12/522,901

(22) PCT Filed: Jan. 10, 2008

(86) PCT No.: PCT/US2008/050814
§ 371 (c)(1),
(2), (4) Date: Feb. 19, 2010

(87) PCT Pub. No.: WO2008/086504
PCT Pub. Date: Jul. 17, 2008

(65) Prior Publication Data
US 2010/0169443 A1 Jul. 1, 2010

Related U.S. Application Data

(60) Provisional application No. 60/884,395, filed on Jan. 10, 2007.

(51) Int. Cl.
*G06F 15/16* (2006.01)
(52) U.S. Cl.
USPC .......................................... 709/206; 709/220
(58) Field of Classification Search
USPC ........................ 709/206–207, 220
See application file for complete search history.

(56) References Cited

U.S. PATENT DOCUMENTS

| 7,113,803 | B2 | 9/2006 | Dehlin |
| 7,317,699 | B2 | 1/2008 | Godfrey et al. |
| 7,353,016 | B2 | 4/2008 | Roundtree et al. |
| 7,475,115 | B2 | 1/2009 | Gardner et al. |

(Continued)

FOREIGN PATENT DOCUMENTS

| WO | WO-2005081852 A2 | 9/2005 |
| WO | WO-2005083996 A1 | 9/2005 |

(Continued)

OTHER PUBLICATIONS

U.S. Appl. No. 12/446,221, filed Jan. 6, 2010, Roundtree.

(Continued)

*Primary Examiner* — Jason Recek
(74) *Attorney, Agent, or Firm* — Perkins Coie LLP

(57) ABSTRACT

A software and/or hardware facility that allows users to enable e-mail on a mobile device in an automated fashion. Using a mobile device, a user selects an e-mail service that they desire to access. An access request is made from the mobile device to a configuration management server. The configuration management server sends an e-mail, SMS message, or other message to the user or to a system administrator with the access request. The user or system administrator is presented with a form that allows the user or administrator to provide sufficient information to enable e-mail service for the mobile device. The configuration management server may store the received information in a database so that the information can be re-used by other mobile device users having the same e-mail domain. The information is transmitted to the mobile device and is used to enable e-mail service on the device.

40 Claims, 5 Drawing Sheets

(56) References Cited

U.S. PATENT DOCUMENTS

| | | | |
|---|---|---|---|
| 7,580,367 B2 | 8/2009 | Bleckert et al. | |
| 2002/0078185 A1* | 6/2002 | Swerup et al. | 709/220 |
| 2004/0002943 A1 | 1/2004 | Merrill et al. | |
| 2004/0137919 A1* | 7/2004 | Biundo | 455/466 |
| 2005/0141438 A1 | 6/2005 | Quetglas et al. | |
| 2005/0260996 A1 | 11/2005 | Groenendaal | |
| 2006/0036494 A1 | 2/2006 | Aufricht et al. | |
| 2006/0190530 A1 | 8/2006 | Gruneberg et al. | |
| 2006/0195557 A1* | 8/2006 | Dew et al. | 709/220 |
| 2006/0230433 A1* | 10/2006 | Chang | 726/3 |
| 2008/0016187 A1* | 1/2008 | Neil et al. | 709/220 |
| 2008/0119136 A1* | 5/2008 | Khazi | 455/41.2 |

FOREIGN PATENT DOCUMENTS

| | | |
|---|---|---|
| WO | WO-2006034399 A2 | 3/2006 |
| WO | WO-2007002499 A2 | 1/2007 |
| WO | WO-2008022291 A2 | 2/2008 |
| WO | WO-2008086504 A2 | 7/2008 |

OTHER PUBLICATIONS

International Search Report and Written Opinion for International Application No. PCT/US08/50814, Mail Date Jul. 11, 2008, 10 pages.

Lin, et al., "An introduction to OMA Device Management," <http://www.ibm.com/developerworks/library/wi-oma/index.html>, internet accessed on Feb. 10, 2010, 11 pages.

MSDN, "OMA DM version 1.1.2 Architecture," <http://msdn.microsoft.com/en-us/library/bb737307(printer).aspx>, internet accessed on Feb. 10, 2010, 3 pages.

MSDN, "OMA DM Standards and Extensions," <http://msdn.microsoft.com/en-us/library/bb737228(printer).aspx>, internet accessed on Feb. 10, 2010, 7 pages.

Open Mobile Alliance Ltd., "OMA Device Management Notification Initiated Session, OMA-TS-DM_Notification-V1_2_1-20080617-A," Jun. 17, 2008, 16 pages.

* cited by examiner

METHOD AND SYSTEM FOR CONFIGURING E-MAIL FOR MOBILE DEVICES

CROSS-REFERENCE TO RELATED APPLICATION

This application is a U.S. National Phase Application of International Application Serial No. PCT/US08/50814, filed Jan. 10, 2008, which claims priority to, and incorporates by reference in its entirety, U.S. Provisional. Application No. 60/884,395, filed on Jan. 10, 2007.

BACKGROUND

As the use of mobile devices such as cellular phones, personal digital assistants (PDAs), portable computing devices, and mobile e-mail devices has expanded, the desire of users to utilize the devices to access e-mail systems has also increased. Unfortunately, connecting any mobile device to an e-mail system is not an easy task that may be completed without specialized knowledge. In particular, connecting to an enterprise e-mail system may require the assistance and support of members of an information technology (IT) department to either offer technical assistance or to implement the requested change. For the average non-technical user, finding the appropriate person to contact in the IT department, asking the right questions about the desired service that the user would like implemented, and providing the right information to the IT staff can be a very daunting task that is fraught with the possibility of error. Even if the correct person is identified in the IT department, one or more conversations may be required before the desired functionality is implemented. Moreover, because of the level of interaction that may be required, it is often beneficial to only request such a change when at the enterprise office. Implementing such a change remotely, such as when using the mobile device, only adds to the complexity of the operation. From an end-user perspective, it would therefore be beneficial for a simpler method and system to be developed to enable a user to add e-mail connectivity to a mobile device with a minimum amount of effort.

DETAILED DESCRIPTION

A software and/or hardware facility is described that allows users to enable e-mail on a mobile device in an automated fashion and with a minimal amount of technical support interaction. Using a mobile device, a user is allowed to select an e-mail service that they desire to access from the mobile device. An e-mail system administrator ("sysadmin") may be associated with the desired e-mail service. An access request is made from the mobile device to a configuration management server. The configuration management server sends an e-mail, SMS message, or other message to the user or the system administrator with the access request. The user or system administrator is presented with a form that allows the user or sysadmin to quickly provide sufficient information to enable e-mail service for the mobile device. The received information is used to automatically configure the e-mail of the mobile device, and the user is alerted when the service is ready for use. The configuration management server may store the information received from the user or sysadmin in a database so that the information can be re-used by other mobile device users with the same e-mail domain. Storing the information minimizes the amount of input needed from other users requesting access to or system administrators managing access to the e-mail domain in the future.

Various embodiments of the facility will now be described. The following description provides specific details for a thorough understanding and enabling description of these embodiments. One skilled in the art will understand, however, that the facility may be practiced without many of these details. Additionally, some well-known structures or functions may not be shown or described in detail so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention. While certain terms may be emphasized below, any terminology intended to be interpreted in a restricted manner will be overtly and specifically defined as such in this Detailed Description section.

Figure 1:
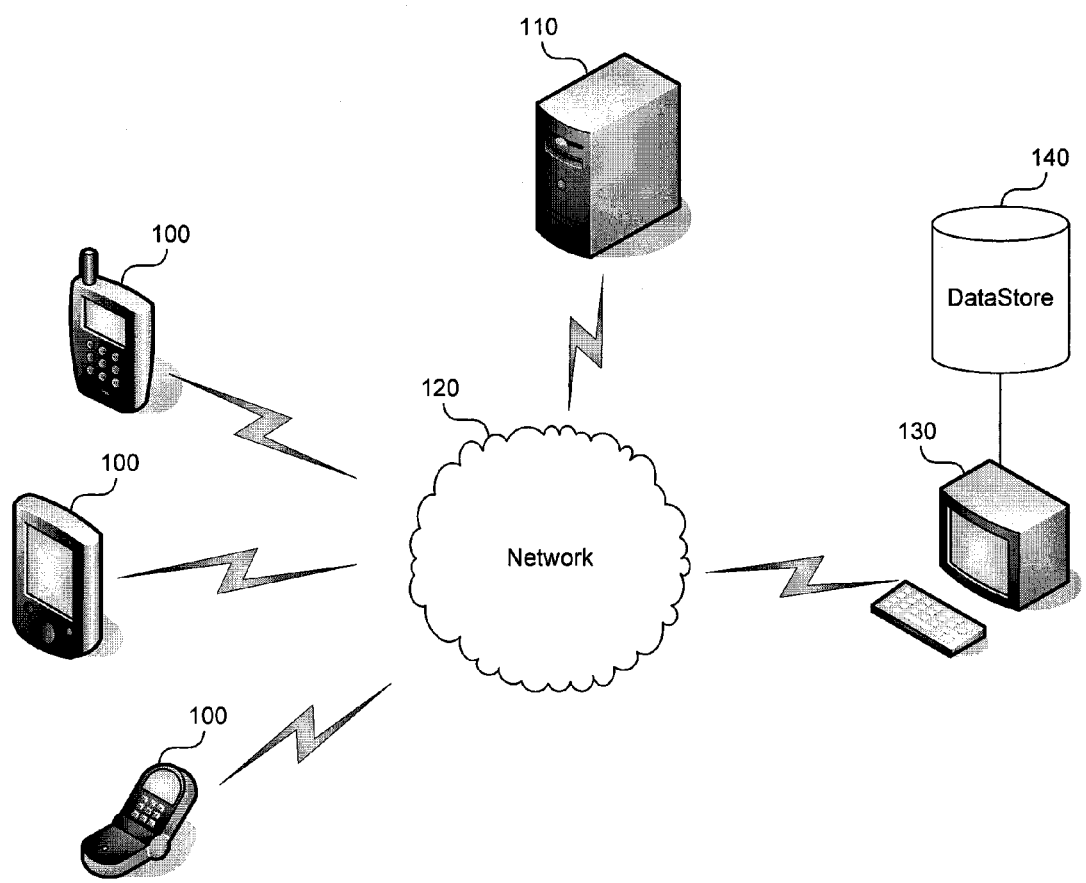
FIG. 1 is a block diagram of a networked environment in which e-mail may be configured for remote devices.

FIG. 1 depicts a suitable computing environment in which the disclosed facility for enabling e-mail access on mobile devices 100 may be implemented. Mobile devices may be cellular phones, personal digital assistants (PDAs), portable computing devices, mobile e-mail devices, or any other device that allows remote access to e-mail. Mobile devices can communicate with an e-mail system 110 through a network 120. Network 120 may be a public network, such as the Internet, or a private or semi-private network, such as an intranet. Elements of the network may be implemented using wireless technologies, such as a cellular network, or wired technologies, such as fiber-optic or other wired technologies. Mobile devices may also communicate with a configuration management server 130 via the network 120. The configuration management server 130 may be connected to data storage 140 that contains a database or list of e-mail systems and corresponding configuration information. As will be described in additional detail below, the configuration management server receives requests from users for access to e-mail services from their mobile devices. The requests are routed to e-mail system administrators or to the user's personal computer or other computer of the user having a more accessible user interface than the user's mobile device. The facility described herein allows the e-mail system administrator or user to quickly and easily fulfill such requests using a minimum of effort.

Figure 2:
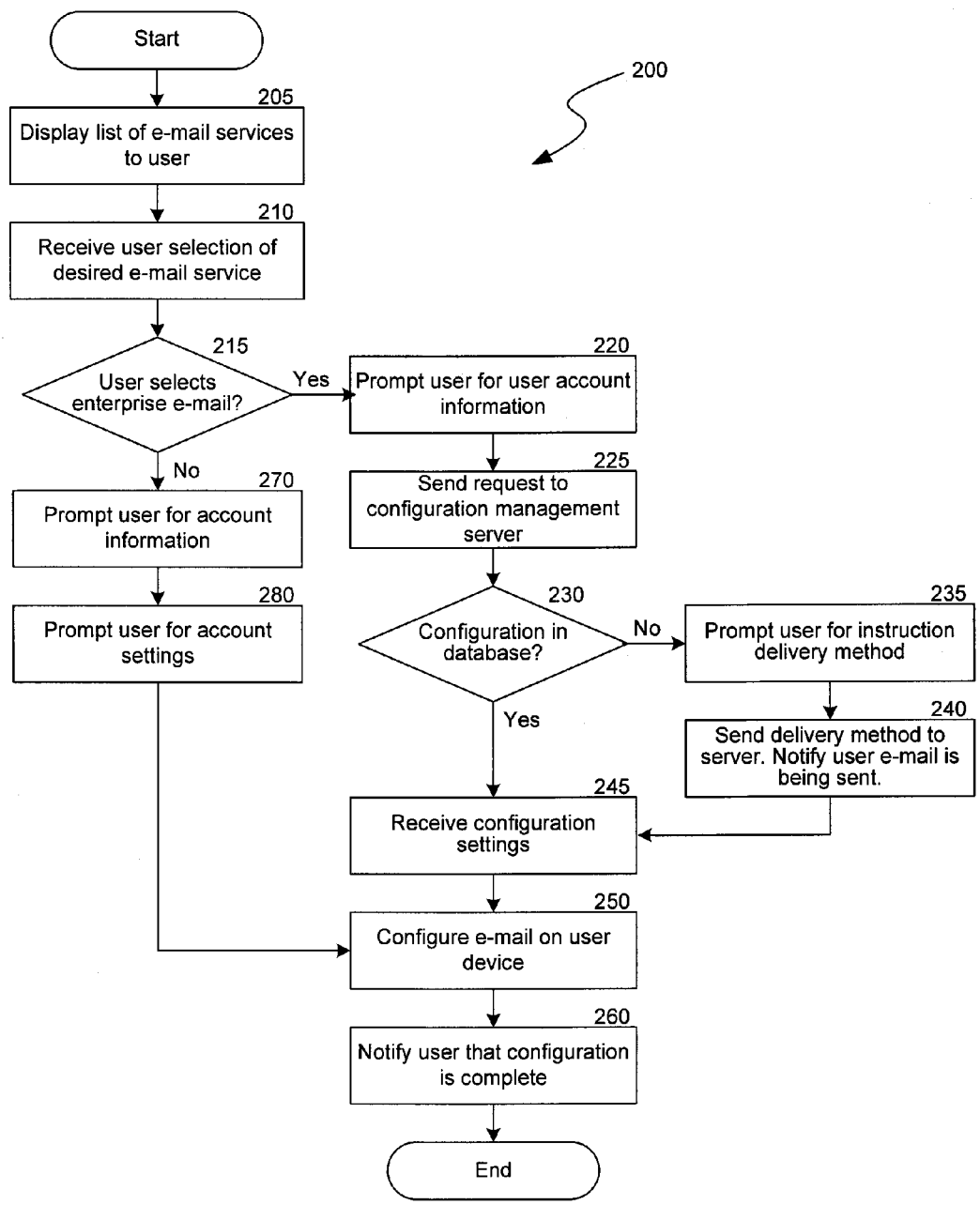
FIG. 2 is a flow chart of a method of configuring e-mail in a mobile device.
Figure 3:
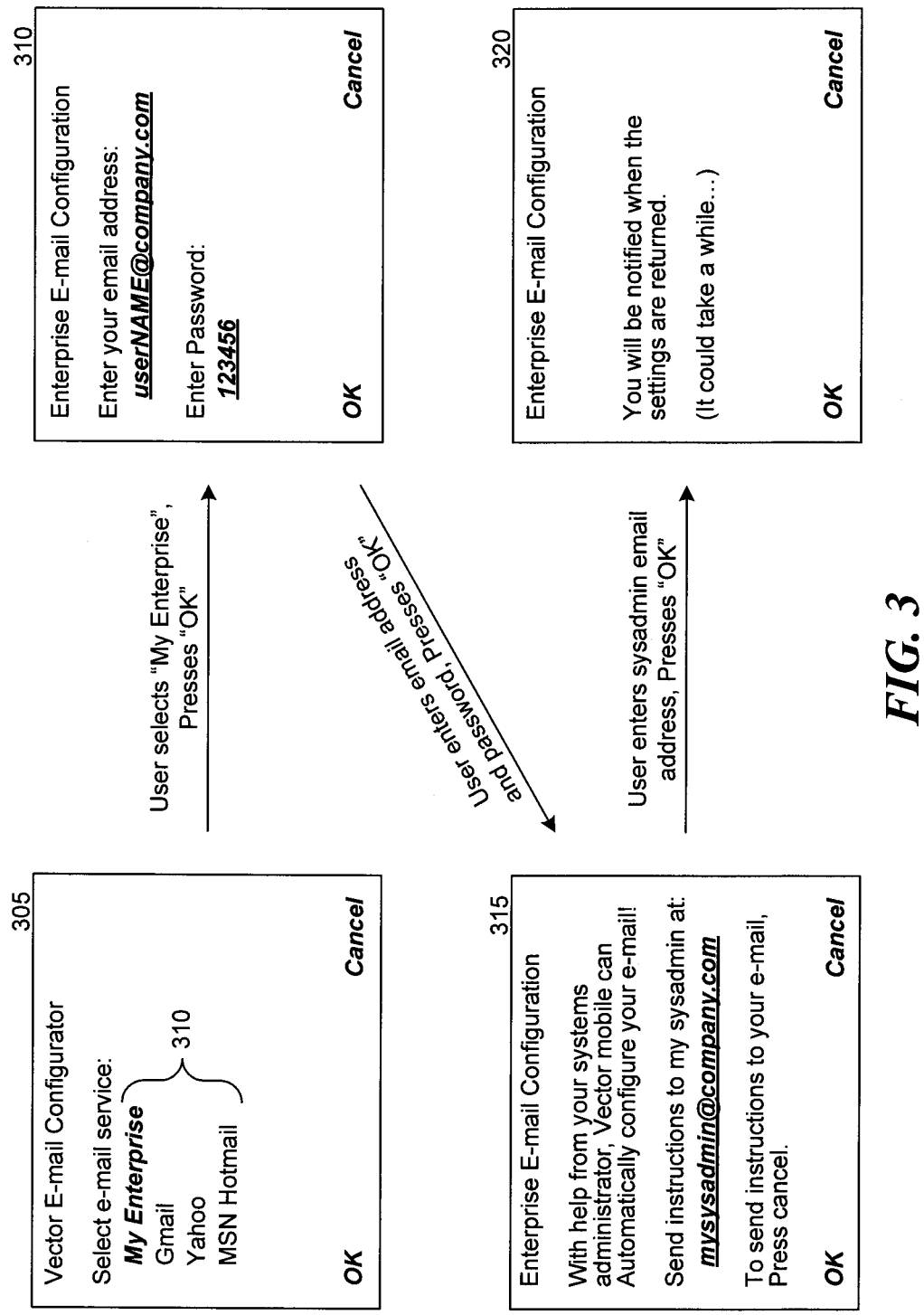
FIG. 3 is a series of representative screen shots that may be displayed to a user on the mobile device during the e-mail configuration process.

FIG. 2 is a flow chart of a process 200 implemented by the facility to enable a user to request access to, and be configured for access with, e-mail service using a mobile device. At a block 205, the facility displays a list on the mobile device of e-mail services that are available to the user. A first representative screenshot 305, such as what may be displayed to a user on a mobile device, is depicted in FIG. 3. A list 310 of e-mail services, such as "My Enterprise," "Gmail," and "Yahoo" are presented to the user. The user is able to select an e-mail service from the list of services that it would like to be able to access from their mobile device. Those skilled in the art will appreciate that the displayed list may offer a greater or lesser number of e-mail services than those depicted in list 310, and a user may be offered the ability to manually add or select e-mail services that are not included in the list. The list can be generated locally on the device, or received from a remote server via a wireless connection. Returning to FIG. 2, at a block 210 the facility receives a selection from the user of a desired e-mail service. At a decision block 215, the facility determines whether the user has requested access to an enterprise e-mail account. If the user has requested access to an enterprise e-mail account, at a block 220 the facility prompts the user to enter the user's e-mail account information. Such account information may include, but not be limited to, the user's e-mail address and e-mail password as is depicted in a second representative screenshot 310 of FIG. 3. An e-mail address consists of an e-mail user name (for example, "user-NAME"), an ampersand character '@', followed by a domain name (for example, "company.com"). At a block 225, the mobile device sends a configuration request to a configuration management server. Communications between the mobile device and configuration management server may be delivered by SMS, MMS, USSD, GPRS, IP, IPV6, or any other data communication method. The configuration request may contain the e-mail user name, domain name, or other information.

Figure 4:
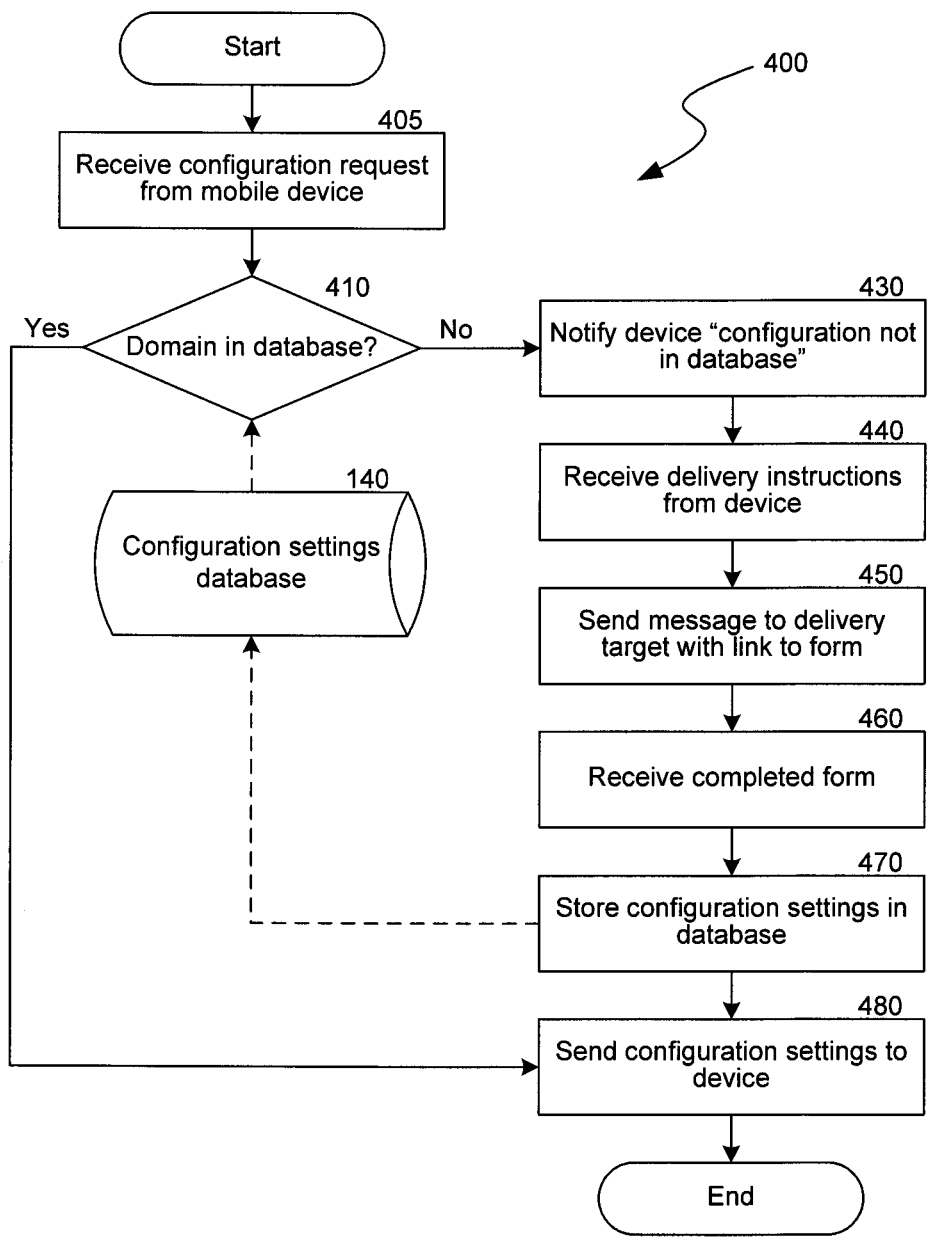
FIG. 4 is a flow chart of a method of configuring e-mail by a configuration management server.

FIG. 4 is a flow chart of a process 400 implemented by the configuration management server 130 to respond to the configuration request. At a block 405, the configuration management server receives a communication indicating an access request from the user. The communication may come directly from the mobile device or via an intermediate server hosting a web page, WAP page, USSD menu, SIM card menus, etc. At a decision block 410, the configuration management server accesses data store 140 to determine if the e-mail domain name contained in the configuration request is already stored in the database. If the e-mail domain name is found in the database, the associated e-mail configuration information may be retrieved by the server and sent to the mobile device at a block 480. Otherwise process 400 proceeds to block 430, where an indication that the configuration is not in the database is sent from the configuration management server to the mobile device.

Referring back to FIG. 2, the mobile device responds to the communication from the configuration management server at decision block 230. If the configuration settings are present in the database, at block 245 the configuration settings are received from the configuration management server. If configuration settings are not present in the database, process flow continues to block 235, where the user may optionally be prompted for an e-mail address to have instructions delivered. For example, a representative screenshot 315 in FIG. 3 prompts the user to select whether instructions should be delivered to the user's e-mail address or forwarded to a specified e-mail address of the user's e-mail systems administrator. After a delivery address is specified, at block 240 the address is sent to the configuration management server, and the facility displays a message to the user informing the user that instructions will be delivered. For example, a representative mobile device screenshot 320 informs the user that the user will receive an e-mail on their desktop with instructions, and will be notified when the e-mail is ready to be used on the user's device.

Figure 5:
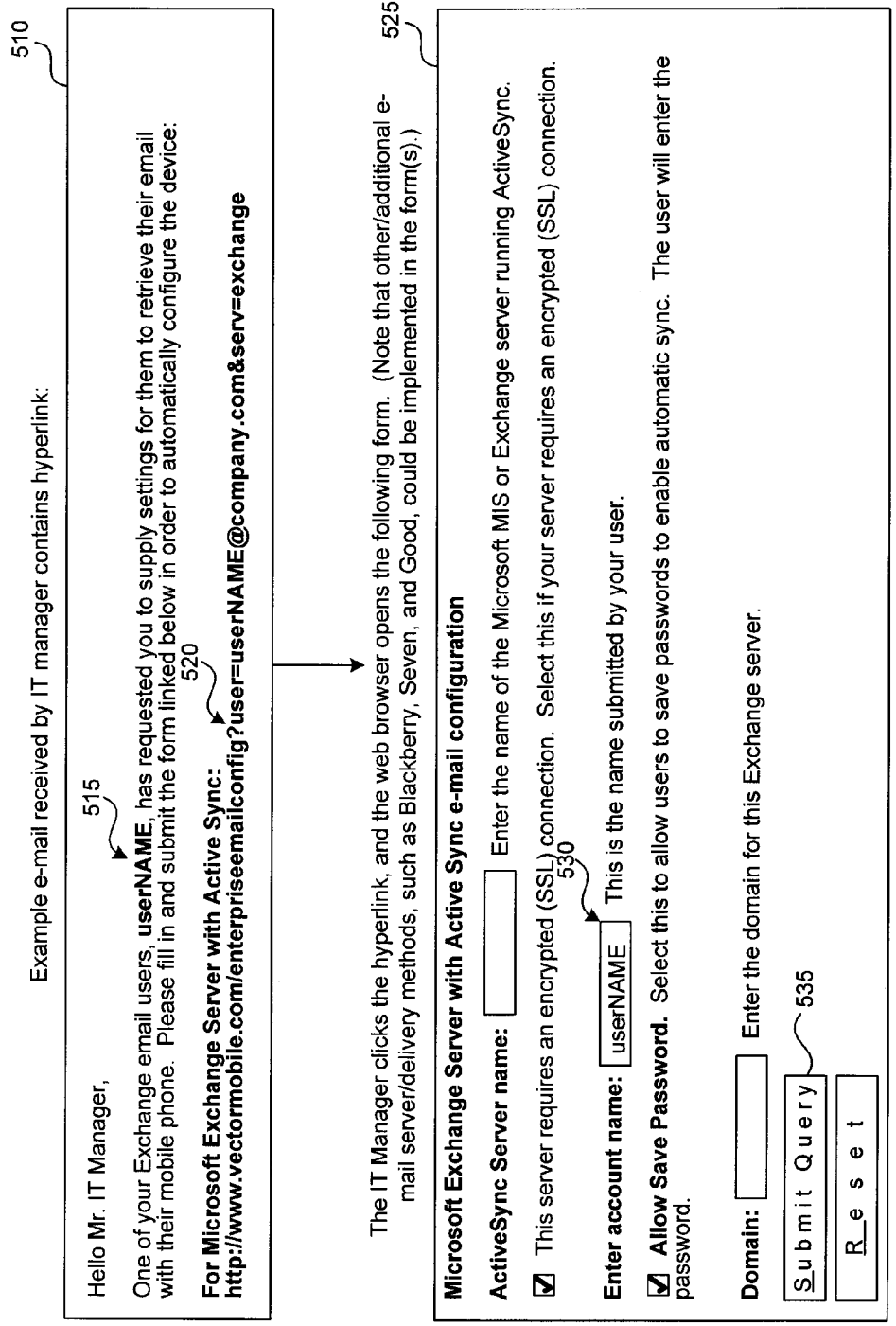
FIG. 5 is a representative e-mail and form that an e-mail system administrator or a user completes as part of the e-mail configuration process.

Referring back to FIG. 4, at a block 440 the configuration management server receives the delivery instructions from the user. At a block 450, the facility sends an e-mail (or SMS or other message format) to the user or to the system administrator with a hyperlink to a form for completion. If the e-mail is sent to the user, the e-mail may contain instructions to forward the e-mail on to their system administrator for processing. Alternatively, the user may complete the form themselves, but in the environment of a desktop or other computer having an interface that is easier to use than the mobile device. An example e-mail 510 sent to a system administrator is depicted in FIG. 5. The e-mail 510 includes an identification 515 of the user making the request for e-mail access. The e-mail also includes a hyperlink 520 to a form for the system administrator to complete in order for the request to be processed. The recipient of the e-mail may click on the hyperlink to be taken to the form corresponding to the request.

A representative form 525 is depicted in FIG. 5 for a user requesting access to a Microsoft Exchange server. Those skilled in the art will appreciate that other forms may be constructed depending on the particular requested service. For example, forms for other e-mail services such as BlackBerry, Seven, and Good could be implemented by the facility. Various e-mail service fields may also be combined onto a single form. Each form contains one or more fields that the system administrator may complete in order to enable the e-mail connection. Some of the fields may be pre-populated by the facility with appropriate information provided by the user. For example, in the form 525, an account name that was entered by the user has already been populated into the form. Additional information that is stored in data storage 140 may also be used to pre-populate the form. For example, various connection information, server names or IP addresses, service types, and connection settings may be stored in the data storage 140. As the system administrator or user enters additional information into the form, the data storage may be supplemented or updated with the newly-entered information as necessary. Once the system administrator or user fills in all necessary fields in the form 525, the system administrator or user selects a "submit query" button 535.

Returning to FIG. 4, at a block 460 the configuration management server receives a completed form from the user or the system administrator. At a block 470 the facility optionally stores e-mail server configuration data from the submitted form in the database contained in data storage 140. At a block 480, the configuration management server sends the configuration data to the mobile device.

Returning to FIG. 2, at a block 245 the mobile device receives the configuration data from the configuration management server. At a block 250, the device configures the e-mail on the user's device using the configuration data. An example of how this can be accomplished on a Windows Mobile 2003 or 5 device is described by the following steps:

1. Format the configuration data into an XML structure. The XML structure should contain the proper configuration service provider (such as "Sync" configuration service provider for an ActiveSync server configuration, or "EMAIL2" configuration service provider for an internet mail server configuration) along with an appropriate list of names and values of parameters to be configured (such as the parameters: "UseSSL", "Domain", "Password", "SavePassword", "Server", "URI", "User", "EmailAddress", "Enabled", for the "Connection", "Mail", "Calendar", and "Contacts" characteristics of the "Sync" configuration service provider).
2. Call the Windows Mobile API function "DMProcessConfigXML( )," passing in the XML structure as well as the appropriate flag to process the XML structure as input data.

An alternate method of configuring the e-mail on the user's device may involve an OMA DM standards-based message containing appropriate e-mail configuration commands being sent to, and processed by, the device. When the configuration of the user's mobile device is complete, at a block 260 the facility provides a message to the user that notifies the user that the configuration is complete. The facility may optionally provide further instructions to the user about various e-mail features that are now available to the user. The e-mail setup could include setting up the synchronization of features used in conjunction with e-mail, such as contact lists, calendars, dictionaries, task lists, etc. The e-mail set-up may also include installation or provisioning of additional software that is used in conjunction with the user's e-mail service, for example software allowing connection of an e-mail client to the e-mail server across a VPN (virtual private network). From either the server or the handset, either the user or the facility may perform steps to test the e-mail settings.

If the user requests access to an e-mail system other than an enterprise system at decision block 215, the processing continues to a block 270. At block 270 the facility prompts the user to enter the user's e-mail account information, such as an e-mail address, password, e-mail server information, and other characteristics necessary to access the requested e-mail service. At block 280, the user may optionally be prompted to enter any account settings for the requested service, such as "remember password," "leave on server" (for POP3), etc. Processing then continues to block 250.

It will be appreciated that in certain circumstances, multiple sets of configuration information may be stored in the database in association with a single domain. For example, large enterprises or corporations may have multiple email servers, each with different configuration information for the domain used by the enterprise or corporation. If multiple sets of configuration information are stored in the database in association with a single domain, the facility may sequentially try each set of configuration information until a set is found that enables e-mail on the requesting mobile device. Alternatively, the facility may send a message to a user or a system administrator that provides the different sets of configuration information and requests the user or the system administrator to select which set of configuration information to use when enabling e-mail for the mobile device.

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention. For example, while processes are presented in a given order, alternative embodiments may perform routines having steps in a different order, and some steps may be deleted, moved, added, subdivided, combined, and/or modified. Each of these processes may be implemented in a variety of different ways. Also, while processes are at times shown as being performed in series, these processes may instead be performed in parallel, or may be performed at different times.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of providing configuration parameters to a mobile device to allow the mobile device to access an e-mail service, the method comprising:
   receiving a request from a user to access an e-mail service, the request transmitted from a mobile device of the user and containing an e-mail address of the user having a domain name corresponding to the e-mail service;
   querying a configuration settings database to determine whether configuration parameters associated with the domain name from the user's e-mail address are stored in the configuration settings database, the database storing configuration parameters associated with a plurality of domain names and a plurality of e-mail services, each e-mail service having an associated system administrator;
   if configuration parameters associated with the domain name are stored in the configuration settings database, transmitting the stored configuration parameters to the mobile device of the user so that the mobile device can be configured to access the e-mail service; and
   if configuration parameters associated with the domain name are not stored in the configuration settings database, querying a system administrator of the requested e-mail service for configuration parameters associated with the domain name that are necessary to access the e-mail service, receiving configuration parameters from the system administrator, and transmitting the received configuration parameters to the mobile device of the user so that the mobile device can be configured to access the e-mail service.

2. The method of claim 1, wherein the configuration parameters that are queried to the system administrator are dependent on the e-mail service in the plurality of e-mail services to which access is being sought.

3. The method of claim 1, wherein querying a system administrator for configuration parameters comprises:
   prompting the user for an address associated with the system administrator;

receiving the system administrator address from the user; and transmitting a message to the system administrator at the received system administrator address.

4. The method of claim 3, wherein the address is an e-mail address and the message is an e-mail message.

5. The method of claim 3, wherein the address is an instant messaging address and the message is an instant message.

6. The method of claim 3, wherein the address is a VPN service address.

7. The method of claim 1, wherein querying a system administrator for configuration parameters comprises transmitting a message to the user with instructions to the user to forward the message to the system administrator.

8. The method of claim 1, wherein querying a system administrator for configuration parameters includes providing a link to a form that is completed by the system administrator.

9. The method of claim 8, wherein the form contains a plurality of data fields, a portion of which are pre-populated with data.

10. The method of claim 1, further comprising storing the configuration parameters received from the system administrator in the configuration settings database, the received configuration parameters being associated with the domain name from the user's e-mail address.

11. The method of claim 1, further comprising notifying the user when the mobile device has been configured to access the e-mail service.

12. The method of claim 1, further comprising directing the user to install additional applications used in conjunction with the e-mail service.

13. A system for providing configuration parameters to a mobile device to allow the mobile device to access an e-mail service, the system comprising:
a configuration settings database that contains a plurality of domain names and configuration parameters associated with each of the plurality of domain names; and
a configuration server coupled to the configuration settings database and configured to:
receive a request from a user to access an e-mail service, the request transmitted from a mobile device of the user and containing an e-mail address of the user having a domain name corresponding to the e-mail service;
query the configuration settings database to determine whether configuration parameters associated with the domain name from the user's e-mail address are stored in the configuration settings database, the database storing configuration parameters associated with a plurality of domain names and a plurality of e-mail services, each e-mail service associated with a system administrator;
if configuration parameters associated with the domain name are stored in the configuration settings database, transmit the stored configuration parameters to the mobile device of the user so that the mobile device can be configured to access the e-mail service; and
if configuration parameters associated with the domain name are not stored in the configuration settings database, query a system administrator of the requested e-mail service for configuration parameters associated with the domain name that are necessary to access the e-mail service, receive configuration parameters from the system administrator, and transmit the received configuration parameters to the mobile device of the user so that the mobile device can be configured to access the e-mail service.

14. The system of claim 13, wherein the configuration parameters that are queried to the system administrator are dependent on the e-mail service in the plurality of e-mail services to which access is being sought.

15. The system of claim 13, wherein the query to a system administrator for configuration parameters comprises:
prompting the user for an address associated with the system administrator;
receiving the system administrator address from the user; and
transmitting a message to the system administrator at the received system administrator address.

16. The system of claim 15, wherein the address is an e-mail address and the message is an e-mail message.

17. The system of claim 15, wherein the address is an instant messaging address and the message is an instant message.

18. The system of claim 15, wherein the address is a VPN service address.

19. The system of claim 13, wherein the query to a system administrator for configuration parameters comprises transmitting a message to the user with instructions to the user to forward the message to the system administrator.

20. The system of claim 13, wherein the query to a system administrator for configuration parameters includes providing a link to a form that is completed by the system administrator.

21. The system of claim 20, wherein the form contains a plurality of data fields, a portion of which are pre-populated with data.

22. The system of claim 13, wherein the configuration server is further configured to store the configuration parameters received from the system administrator in the configuration settings database, the received configuration parameters being associated with the domain name from the user's e-mail address.

23. The system of claim 13, wherein the configuration server is further configured to notify the user when the mobile device has been configured to access the e-mail service.

24. The system of claim 13, wherein the configuration server is further configured to direct the user to install additional applications used in conjunction with the e-mail service.

25. A method of providing configuration parameters to a mobile device to allow the mobile device to access an e-mail service, the method comprising:
receiving a request from a user to access an e-mail service, the request transmitted from a mobile device of the user and containing an e-mail address of the user having a domain name corresponding to the e-mail service;
querying a configuration settings database to determine whether configuration parameters associated with the domain name from the user's e-mail address are stored in the configuration settings database, the database storing configuration parameters associated with a plurality of domain names and a plurality of e-mail services;
if configuration parameters associated with the domain name are stored in the configuration settings database, transmitting the stored configuration parameters to the mobile device of the user so that the mobile device can be configured to access the e-mail service; and
if configuration parameters associated with the domain name are not stored in the configuration settings database, prompting the user for an address associated with the requested e-mail service of the user to which a configuration form should be sent, receiving, from the user, an address to which the configuration form should be sent, transmitting to the received address a configuration form containing a plurality of data fields for receiving configuration parameters associated with the domain name that are necessary to access the e-mail service, receiving configuration parameters in a completed configuration form, and transmitting the received configuration parameters to the mobile device of the user so that the mobile device can be configured to access the e-mail service.

26. The method of claim 25, wherein the plurality of data fields is dependent on the e-mail service in the plurality of e-mail services to which access is being sought.

27. The method of claim 25, wherein the received address is an e-mail address.

28. The method of claim 25, wherein the received address is associated with a system administrator.

29. The method of claim 25, wherein the received address is associated with the user.

30. The method of claim 25, wherein a portion of the plurality of data fields are pre-populated with data.

31. The method of claim 25, further comprising storing the received configuration parameters in the configuration settings database, the received configuration parameters being associated with the domain name from the user's e-mail address.

32. The method of claim 25, further comprising notifying the user when the mobile device has been configured to access the e-mail service.

33. A system for providing configuration parameters to a mobile device to allow the mobile device to access an e-mail service, the system comprising:
 a configuration settings database that contains a plurality of domain names and configuration parameters associated with each of the plurality of domain names; and
 a configuration server coupled to the configuration settings database and configured to:
  receive a request from a user to access an e-mail service, the request transmitted from a mobile device of the user and containing an e-mail address of the user having a domain name corresponding to the e-mail service;
  query the configuration settings database to determine whether configuration parameters associated with the domain name from the user's e-mail address are stored in the configuration settings database, the settings database storing configuration parameters associated with a plurality of domain names and a plurality of e-mail services;
  if configuration parameters associated with the domain name are stored in the configuration settings database, transmit the stored configuration parameters to the mobile device of the user so that the mobile device can be configured to access the e-mail service; and
  if configuration parameters associated with the domain name are not stored in the configuration settings database, prompt the user for an address associated with the e-mail service of the user to which a configuration form should be sent, receive from the user an address to which the configuration form should be sent, transmit to the received address a configuration form containing a plurality of data fields for receiving configuration parameters associated with the domain name that are necessary to access the e-mail service, receive configuration parameters in a completed configuration form, and transmit the received configuration parameters to the mobile device of the user so that the mobile device can be configured to access the e-mail service.

34. The system of claim 33, wherein the plurality of data fields is dependent on the e-mail service in the plurality of e-mail services to which access is being sought.

35. The system of claim 33, wherein the received address is an e-mail address.

36. The system of claim 33, wherein the received address is associated with a system administrator.

37. The system of claim 33, wherein the received address is associated with the user.

38. The system of claim 33, wherein a portion of the plurality of data fields are pre-populated with data.

39. The system of claim 33, wherein the configuration server is further configured to store the received configuration parameters in the configuration settings database, the received configuration parameters being associated with the domain name from the user's e-mail address.

40. The system of claim 33, wherein the configuration server is further configured to notify the user when the mobile device has been configured to access the e-mail service.

* * * * *

UNITED STATES PATENT AND TRADEMARK OFFICE
CERTIFICATE OF CORRECTION

PATENT NO.         : 8,572,189 B2
APPLICATION NO.    : 12/522901
DATED              : October 29, 2013
INVENTOR(S)        : Roundtree et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this
Twenty-second Day of September, 2015

Michelle K. Lee
*Director of the United States Patent and Trademark Office*